(12) United States Patent
Kim

(10) Patent No.: US 9,395,816 B2
(45) Date of Patent: Jul. 19, 2016

(54) DISPLAY DEVICE FOR SELECTIVELY OUTPUTTING TACTILE FEEDBACK AND VISUAL FEEDBACK AND METHOD FOR CONTROLLING THE SAME

(71) Applicant: LG ELECTRONICS INC., Seoul (KR)

(72) Inventor: Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 488 days.

(21) Appl. No.: 13/862,144

(22) Filed: Apr. 12, 2013

(65) Prior Publication Data

US 2014/0240245 A1 Aug. 28, 2014

(30) Foreign Application Priority Data

Feb. 28, 2013 (KR) .................. 10-2013-0022317
Mar. 26, 2013 (WO) .............. PCT/KR2013/002486

(51) Int. Cl.
  *G06F 3/041* (2006.01)
  *G06F 3/01* (2006.01)
  *G06F 3/0488* (2013.01)
  *G06F 3/0485* (2013.01)

(52) U.S. Cl.
  CPC .............. *G06F 3/016* (2013.01); *G06F 3/013* (2013.01); *G06F 3/0485* (2013.01); *G06F 3/0488* (2013.01)

(58) Field of Classification Search
  CPC .............. G06F 3/0485; G06F 2203/04104; G06F 2203/04106; G06F 3/013; G06F 3/015; G06F 3/012; G06F 3/016; G06F 3/048; H04N 13/0484; G06G 5/34; G06K 9/00597; G06K 21/32; G06K 2203/0381
  See application file for complete search history.

(56) References Cited

U.S. PATENT DOCUMENTS

| 8,957,847 B1* | 2/2015 | Karakotsios | G06F 3/013 345/156 |
| 2004/0178890 A1* | 9/2004 | Williams | B60Q 9/00 340/425.5 |
| 2006/0093998 A1* | 5/2006 | Vertegaal | G06F 3/011 434/236 |
| 2006/0109256 A1* | 5/2006 | Grant | G06F 3/016 345/173 |
| 2008/0164982 A1 | 7/2008 | Andrews et al. | |
| 2009/0167715 A1* | 7/2009 | Wang | G06F 3/016 345/173 |
| 2010/0079508 A1* | 4/2010 | Hodge | G06F 3/013 345/697 |
| 2010/0238129 A1* | 9/2010 | Nakanishi | G06F 3/016 345/173 |

(Continued)

FOREIGN PATENT DOCUMENTS

| KR | 10-2011-0017236 A | 1/2011 |
| WO | WO 2012/063165 A | 5/2012 |
| WO | WO 2012/082971 A1 | 8/2012 |

*Primary Examiner* — Grant Sitta
*Assistant Examiner* — Amen Bogale
(74) *Attorney, Agent, or Firm* — Birch, Stewart, Kolasch & Birch, LLP

(57) ABSTRACT

A display device for selectively outputting a tactile feedback and a visual feedback and a method for controlling the display device are disclosed. The method for controlling the display device includes outputting at least one of a first visual feedback and a first tactile feedback of a first User Interface (UI) on a UI unit, detecting a user's gaze toward the UI unit through a camera unit, sensing a contact making a movement on the first UI through a sensor unit, outputting a second visual feedback of a second UI in correspondence with the contact making a movement on the first UI, upon detection of the user's gaze, and outputting the first tactile feedback of the first UI in correspondence with the contact making a movement on the first UI, if the user's gaze is not detected.

18 Claims, 9 Drawing Sheets

(56) References Cited

U.S. PATENT DOCUMENTS

| | | |
|---|---|---|
| 2011/0316798 A1 | 12/2011 | Jackson et al. |
| 2012/0083312 A1 | 4/2012 | Kim |
| 2012/0154132 A1* | 6/2012 | Lee .................. G06F 3/013 340/407.1 |
| 2012/0256848 A1* | 10/2012 | Madabusi Srinivasan ............ G06F 1/1626 345/173 |
| 2013/0100008 A1* | 4/2013 | Marti .................. G06F 3/011 345/156 |
| 2013/0154959 A1* | 6/2013 | Lindsay ................ G06F 1/1694 345/173 |
| 2013/0307786 A1* | 11/2013 | Heubel .................. G08B 6/00 345/173 |
| 2013/0342672 A1* | 12/2013 | Gray .................. G06F 3/013 348/78 |

* cited by examiner

DISPLAY DEVICE FOR SELECTIVELY OUTPUTTING TACTILE FEEDBACK AND VISUAL FEEDBACK AND METHOD FOR CONTROLLING THE SAME This application claims the benefit of Korean Patent Application No. 10-2013-0022317, filed on Feb. 28, 2013 and the benefit of International Patent Application No. PCT/KR2013/002486, filed on Mar. 26 2013, which is hereby incorporated by reference as if fully set forth herein.

BACKGROUND OF THE DISCLOSURE

1. Field of the Disclosure

The disclosure relates to a display device, and more particularly, to a touch-sensitive display device for selectively outputting at least one of a visual feedback and a tactile feedback and a method for controlling the same.

2. Discussion of the Related Art

Along with the proliferation of display devices equipped with display units, a user can visually identify the operation state of a display device by a visual feedback displayed on a display unit and control the operation state of the display device accordingly. The display device may further include a tactile feedback unit and may indicate the operation state of the display device to the user through a tactile feedback. Accordingly, the user can identify and control the operation state of the display device by the sense of touch as well as by the sense of vision.

However, the display unit and the tactile feedback unit consume power to provide a visual feedback and a tactile feedback to the user, respectively. There exists a need for a power saving method to minimize unnecessary power consumption of the display device that receives power from a battery. Moreover, the display device that provides a tactile feedback has difficulty in identifying whether a user's touch input is for receiving a tactile feedback or for controlling a user interface.

SUMMARY OF THE DISCLOSURE

The disclosure is intended to provide a device for identifying the other device and transmitting and receiving data using an earphone and a method for controlling the same. Particularly, the disclosure needs to provide a method for connecting two devices to each other by means of an earphone, instead of a connection scheme using a complicated setting menu.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

The object of the disclosure can be achieved by providing a display device including a User Interface (UI) unit configured to output a UI, a camera unit configured to detect a user's gaze toward the UI unit, and a controller configured to control the UI unit and the camera unit. The UI unit includes a display unit configured to output a visual feedback of the UI, a tactile feedback unit configured to output a tactile feedback of the UI, and a sensor unit configured to sense a contact on the display unit. The controller is configured to output at least one of a first visual feedback and a first tactile feedback of a first UI on the UI unit, to detect the user's gaze toward the UI unit through the camera unit, to sense a first contact making a sliding movement on the first UI through the sensor unit, to output a second visual feedback of a second UI on the display unit in correspondence with the first contact making a sliding movement on the first UI, upon detection of the user's gaze, and to output the first tactile feedback of the first UI through the tactile feedback unit in correspondence with the first contact making a sliding movement on the first UI, if the user's gaze is not detected.

In another aspect of the disclosure, provided herein is a method for controlling a display device, including outputting at least one of a first visual feedback and a first tactile feedback of a first UI on a UI unit, detecting a user's gaze toward the UI unit through a camera unit, sensing a contact making a sliding movement on the first UI through a sensor unit, outputting a second visual feedback of a second UI in correspondence with the contact making a sliding movement on the first UI, upon detection of the user's gaze, and outputting the first tactile feedback of the first UI in correspondence with the contact making a sliding movement on the first UI, if the user's gaze is not detected.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure, illustrate embodiments of the disclosure and together with the description serve to explain the principle of the disclosure. In the drawings.

DETAILED DESCRIPTION OF THE DISCLOSURE

Embodiments will be described in detail with reference to the attached drawings and contents shown in the attached drawings. However, the scope of what is claimed is not limited or restricted by the embodiments.

Although the terms used in the disclosure are selected from generally known and used terms, the terms may be changed according to the intention of an operator, customs, or the advent of new technology. Some of the terms mentioned in the disclosure have been selected by the applicant at his or her discretion, the detailed meanings of which are described in relevant parts of the description herein. Therefore, the disclosure must be understood, not simply by the actual terms used but by the meanings of each term lying within.

In the disclosure, the term 'display device' covers at least one of a smart phone, a smart pad, a tablet PC, a laptop computer, a smart table, a kiosk, a wall display, a music player, a remote controller, and a monitor.

Figure 1:
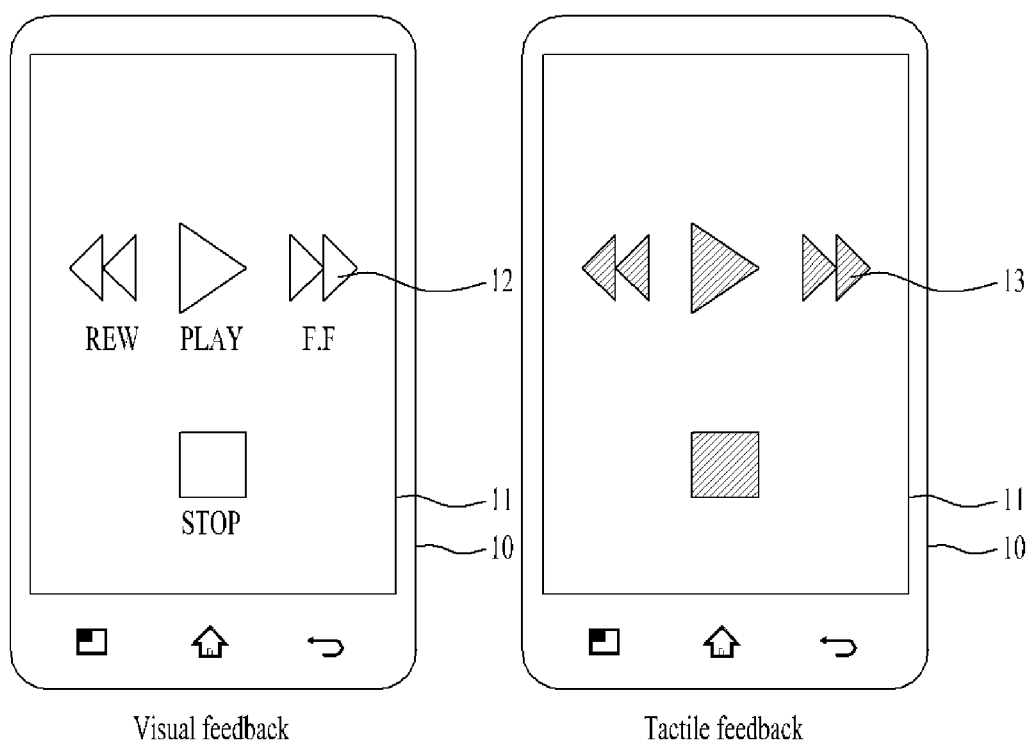
FIG. 1 illustrates a visual feedback and a tactile feedback in a display device according to an embodiment.

FIG. 1 illustrates a visual feedback and a tactile feedback in a display device according to an embodiment. A display device 10 may output at least one of a visual feedback and a tactile feedback in order to provide a User Interface (UI). The display device 10 may include a UI unit 11 for providing a UI to a user. The UI unit 11 may include a tactile feedback unit and a display unit. The tactile feedback unit and the display unit may generate a tactile feedback and a visual feedback and provide them to the user, respectively.

The display device 10 may output a visual feedback and a tactile feedback on a single UI. The visual feedback and the tactile feedback on the same UI may be counterparts. For example, when the display device 10 generates a visual feedback of a first shape in a first area of the UI unit 11 for a first UI, the display device 10 may generate a tactile feedback of the first shape in the first area of the UI unit 11 for the first UI.

The display device 10 may provide a visual feedback 12 to the user by displaying a UI on the UI unit 11. The visual feedback may include a Graphical User Interface (GUI). The user may view the displayed UI and thus control the display device 10. The display device 10 may sense a user's touch input to the UI unit 11 and may execute a function of the UI or a function of the display device 10 corresponding to the position of the user's touch input. In the left drawing of FIG. 1, for example, when the user views a play button and touches the play button with a finger, the display device 10 may perform a play operation. That is, the display device 10 may play a stored music file or media file.

The display device 10 may provide a tactile feedback 13 corresponding to a UI to the user by applying fine current to the UI unit 11 or generating ultrasonic vibrations. Herein, the display device 10 may generate the tactile feedback 13 in the shape of the visual feedback 12 at the position of the visual feedback 12. The display device 10 may generate the tactile feedback 13 in the shape of a soft button displayed as the visual feedback 12 at the position of the soft button.

For example, the display device 10 may display a play button in the shape of a triangle and a stop button in the shape of a square as visual feedbacks at the center of the UI unit 11. The display device 10 may generate a tactile feedback in the shape of a triangle for the play button and a tactile feedback in the shape of a square for the stop button at the center of the UI unit 11, in correspondence with the visual feedbacks. The user may feel the generated tactile feedbacks and control the display device 10 accordingly. The display device 10 may sense a user's touch input to the UI unit 11 and execute a function of the UI corresponding to the position of the user's touch input. For example, in the right drawing of FIG. 1, when the user feels the triangular play button and touches or presses it, the display device 10 may perform a play operation. That is, the display device 10 may play a stored music file or media file.

The display device 10 may detect a user's touch on the UI unit 11. The display device 10 may switch one UI to another UI in correspondence with the touch and provide the changed UI. For example, when the user applies a first contact that makes a sliding movement on a first UI, the display device 10 may move the first UI in correspondence with the first contact. That is, the display device 10 may move the first UI in correspondence with the direction and speed of the first contact. As the display device 10 moves the first UI, it may provide a second UI in the place of the first UI. Herein, the first contact may include a user's touch input for switching the first UI to the second UI as well as a touch input that makes a sliding movement on the first UI.

When providing the first UI or the second UI, the display device 10 may detect the user's gaze. The display device 10 may output one of the first and second UIs depending on whether the user's gaze has been detected. That is, regarding the same first contact on the UI unit 11, the display device 10 may output a different UI depending on whether the gaze has been detected. For example, if the user's gaze has not been detected, the display device 10 may maintain the first UI in response to the first contact. The display device 10 may generate a tactile feedback of the first UI, determining that the first contact is a touch input that the user applies in order to receive the tactile feedback of the first UI.

On the other hand, upon detection of the user's gaze, the display device 10 may switch the first UI to the second UI in response to the first contact. That is, the display device 10 may output at least one of a visual feedback and a tactile feedback of the second UI, determining that the first contact is a touch input that the user applies in order to switch the first UI to the second UI.

Figure 2:
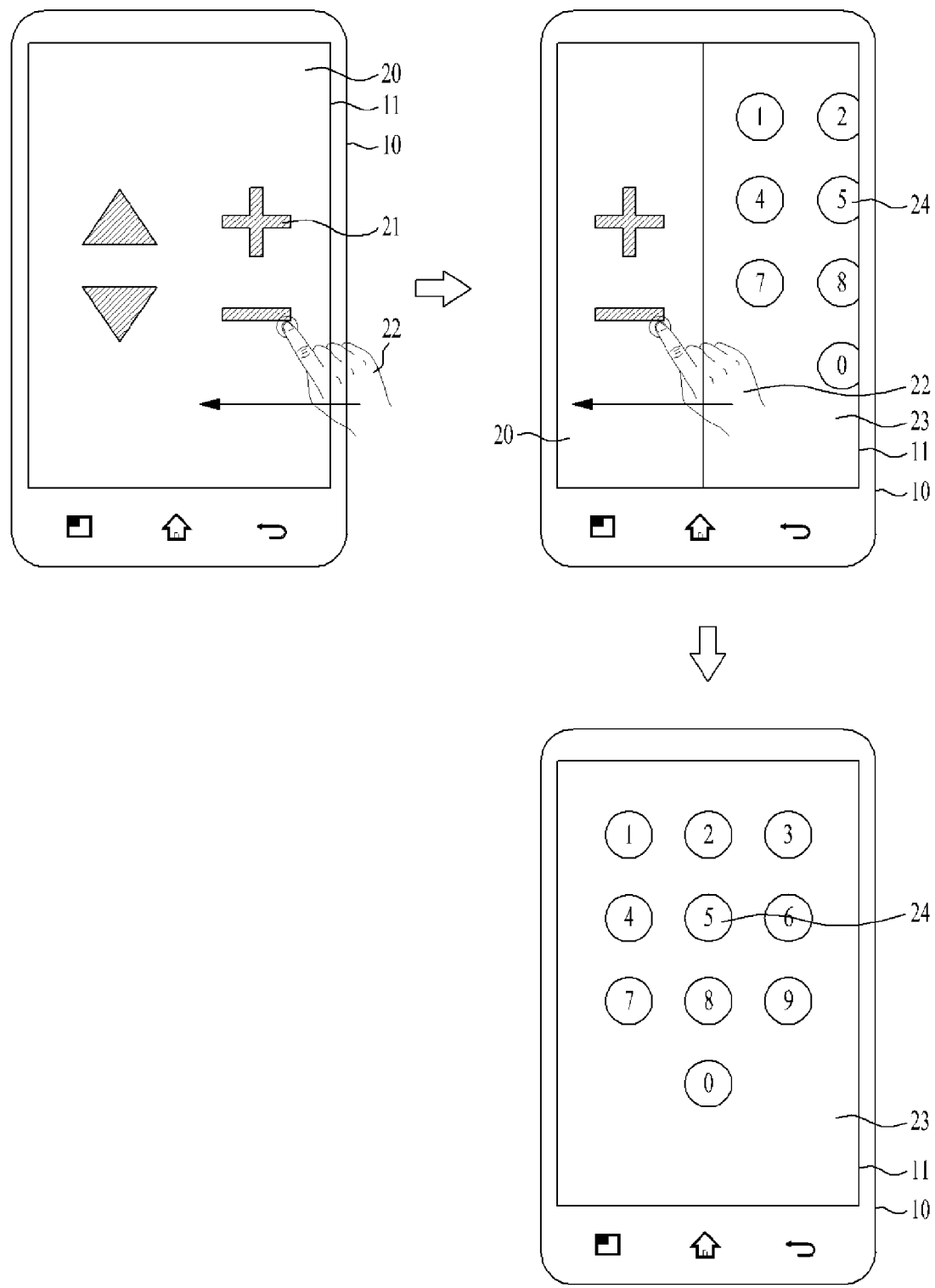
FIG. 2 illustrates a method for switching a tactile feedback of a first User Interface (UI) to a visual feedback of a second UI, upon detection of a user's gaze according to an embodiment.
Figure 3:
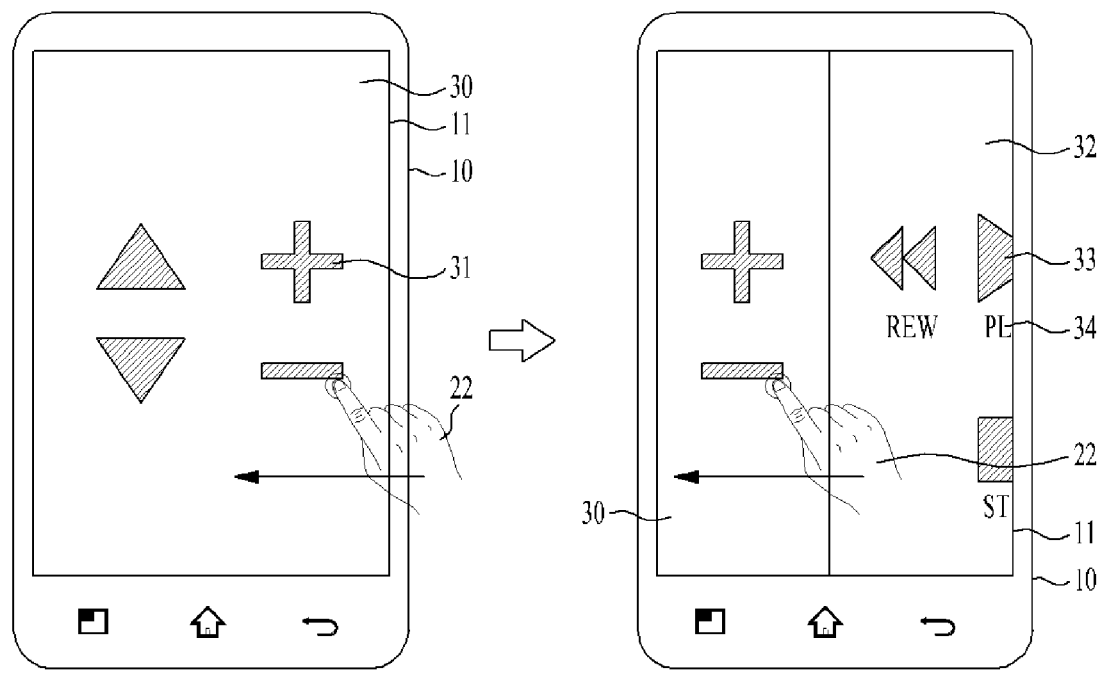
FIG. 3 illustrates a method for switching a tactile feedback of a first UI to tactile and visual feedbacks of a second UI, upon detection of a user's gaze according to an embodiment.
Figure 3:
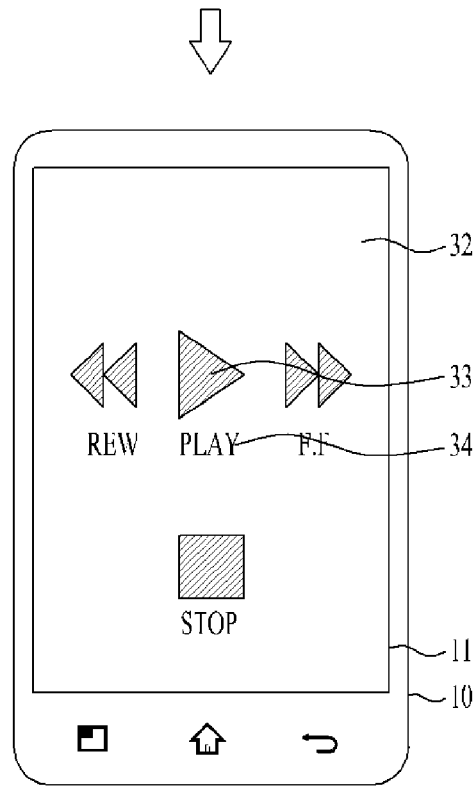
Figure 4:
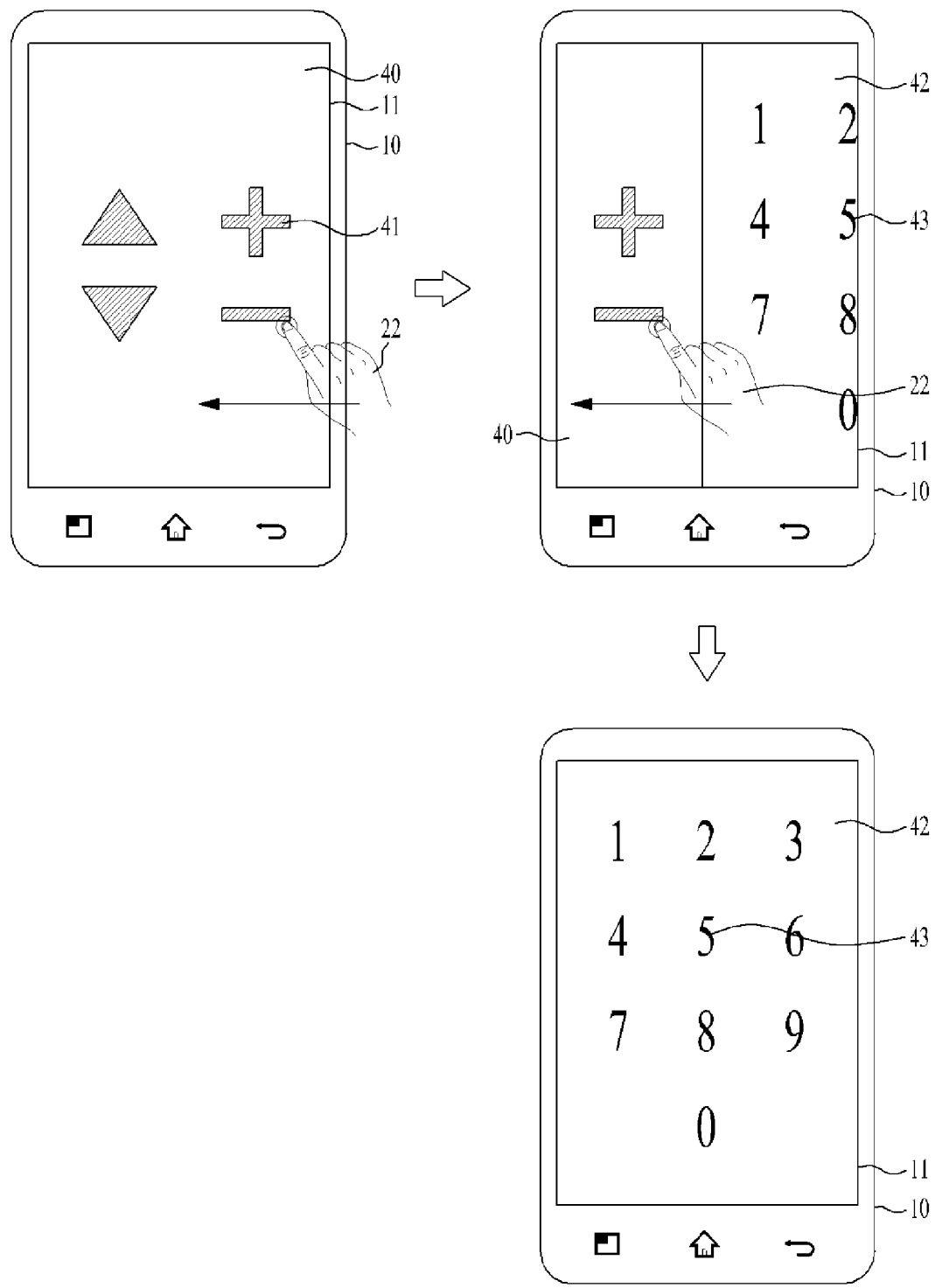
FIG. 4 illustrates a method for switching a tactile feedback of a first UI to a tactile feedback of a second UI, upon detection of a user's gaze according to an embodiment.
Figure 5:
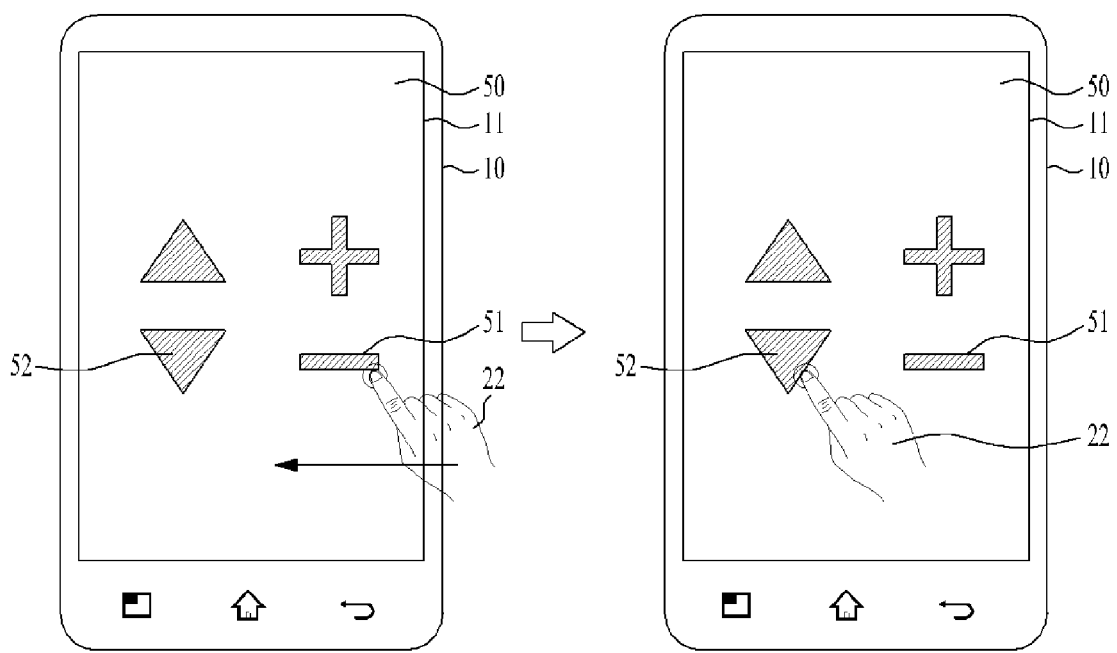
FIG. 5 illustrates a method for maintaining a tactile feedback of a UI, when a user's gaze is not detected according to an embodiment.
Figure 6:
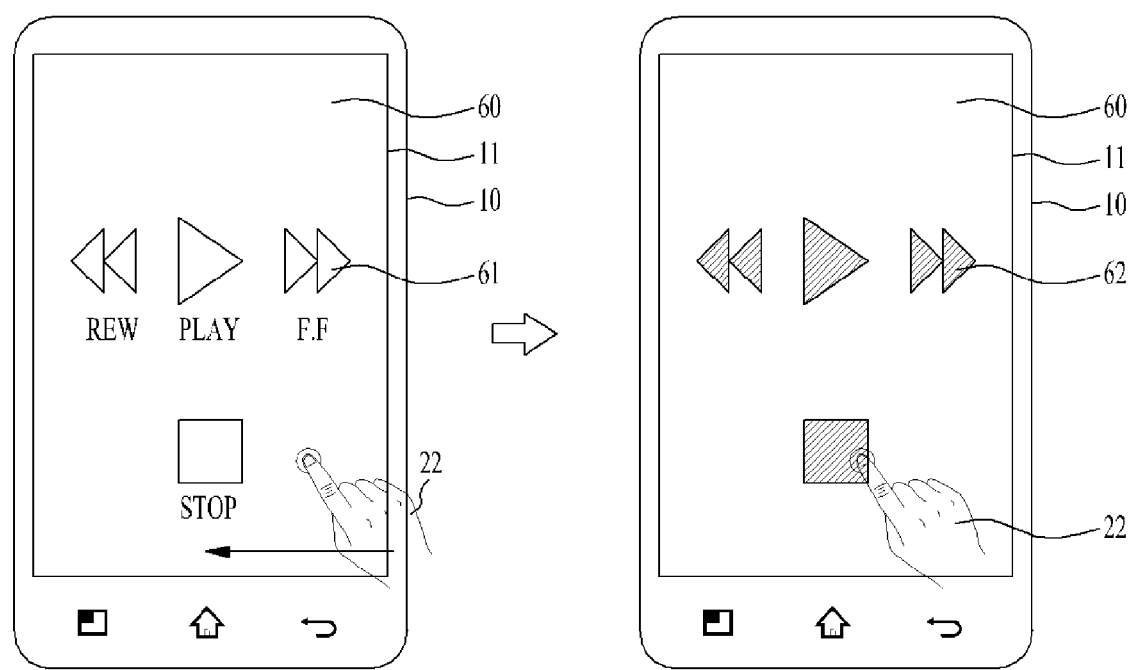
FIG. 6 illustrates a method for switching a visual feedback of a UI to a tactile feedback of the UI, when a user's gaze is not detected according to an embodiment.

FIGS. 2, 3 and 4 illustrate embodiments for the case where the display device has detected a user's gaze. FIGS. 5 and 6 illustrate embodiments for the case where the display device has not detected a user's gaze.

FIG. 2 illustrates a method for switching a tactile feedback of a first UI to a visual feedback of a second UI, upon detection of a user's gaze according to an embodiment. In the left upper drawing of FIG. 2, the display device 10 may provide the user with a first UI 20 on the UI unit 11. The display device 10 may generate a tactile feedback 21 of the first UI 20. The display device 10 may detect the user's gaze by means of a camera unit. The display device 10 may detect the user's gaze by detecting at least one of the user's eye blinking, face, and pupil. Upon detection of the user's gaze, the display device 10 may operate in the following manner.

The display device 10 may sense a first contact 22 on the UI unit 11. The display device 10 may sense the first contact 22 that makes a leftward sliding movement on the first UI 20. The display device 10 may move the first UI to the left in response to the first contact 22. If the user touches a generation area of the tactile feedback 21, while applying the first contact 22, the user may feel the tactile feedback 21 of the first UI 20. Even though the user touches a soft button with the first contact 22, the display device 10 may neglect the touch input to the soft button. That is, the display device 10 may not execute the function of the soft button.

In the right upper drawing of FIG. 2, the display device 10 may slide the first UI 20 to the left in response to the first contact 22. The display device 10 may move the first UI 20 according to the movement speed and direction of the first contact 22. As the first UI 20 is moved, the display device 10 may move a second UI 23 from right to left on the UI unit 11. The display device 10 may display a visual feedback 24 of the second UI 23.

In the right lower drawing of FIG. 2, when the first UI 20 disappears from the left boundary of the UI unit 11, the display device 10 may display the second UI 23 in full screen on the UI unit 11. That is, the display device 10 may display the visual feedback 24 of the second UI 23.

As described above, upon detection of the user's gaze, the display device 10 may detect the first contact 22 that makes a sliding movement on the first UI 20 and thus may move the first UI 20 including the tactile feedback 21. The display device 10 may output the second UI 23 including the visual feedback 24 in succession to the first UI 20. Thus the user may view the visual feedback 24 of the second UI 23 displayed on the display device 10 and control the display device 10 accordingly.

FIG. 3 illustrates a method for switching a tactile feedback of a first UI to tactile and visual feedbacks of a second UI, upon detection of a user's gaze according to an embodiment. In the left upper drawing of FIG. 3, the display device 10 may provide the user with a first UI 30 on the UI unit 11. The display device 10 may generate a tactile feedback 31 of the first UI 30. The display device 10 may detect the user's gaze through the camera unit. Upon detection of the user's gaze, the display device 10 may operate in the following manner.

The display device 10 may sense the first contact 22 of the user on the UI unit 11. The display device 10 may sense the first contact 22 that makes a leftward sliding movement on the first UI 30. The display device 10 may move the first UI 30 to the left in response to the first contact 22. If the user touches a generation area of the tactile feedback 31, while applying the first contact 22, the user may feel the tactile feedback 31 of the first UI 30.

In the right upper drawing of FIG. 3, the display device 10 may slide the first UI 20 to the left in response to the first contact 22. The display device 10 may move the first UI 30 according to the movement speed and direction of the first contact 22. As the first UI 30 is moved, the display device 10 may move a second UI 32 from right to left on the UI unit 11. The display device 10 may display a tactile feedback 33 and a visual feedback 34 of the second UI 32. That is, the display device 10 may generate the tactile feedback 33 of the second UI 32 and display the visual feedback 34 of the second UI on the UI unit 11.

In the right lower drawing of FIG. 3, when the first UI 30 disappears from the left boundary of the UI unit 11, the display device 10 may display the second UI 32 in full screen on the UI unit 11. The display device 10 may generate the tactile feedback 33 of the second UI 32 and display the visual feedback 34 of the second UI 32.

As described above, upon detection of the user's gaze, the display device 10 may detect the first contact 22 that makes a sliding movement on the first UI 30 and thus may move the first UI 30 including the tactile feedback 31. The display device 10 may output the second UI 32 including the tactile feedback 33 and the visual feedback 34 in succession to the first UI 30. Thus the user may feel the tactile feedback 33 of the second UI 32 and view the visual feedback 24 of the second UI 32 displayed on the display device 10. Thus the user may control the display device 10 accordingly.

FIG. 4 illustrates a method for switching a tactile feedback of a first UI to a tactile feedback of a second UI, upon detection of a user's gaze according to an embodiment. In the left upper drawing of FIG. 4, the display device 10 may provide the user with a first UI 40 on the UI unit 11. The display device 10 may generate a tactile feedback 41 of the first UI 40. The display device 10 may detect the user's gaze through the camera unit. Upon detection of the user's gaze, the display device 10 may operate in the following manner.

The display device 10 may sense the first contact 22 of the user on the UI unit 11. The display device 10 may sense the first contact 22 that makes a leftward sliding movement on the first UI 40. The display device 10 may move the first UI 40 to the left in response to the first contact 22. If the user touches a generation area of the tactile feedback 41, while applying the first contact 22, the user may feel the tactile feedback 41 of the first UI 40.

In the right upper drawing of FIG. 4, the display device 10 may slide the first UI 40 to the left in response to the first contact 22. The display device 10 may move the first UI 40 according to the movement speed and direction of the first contact 22. As the first UI 40 is moved, the display device 10 may move a second UI 42 from right to left on the UI unit 11. The display device 10 may output a tactile feedback 43 of the second UI 42. That is, the display device 10 may generate the tactile feedback 43 of the second UI 42.

In the right lower drawing of FIG. 4, when the first UI 40 disappears from the left boundary of the UI unit 11, the display device 10 may display the second UI 42 in full screen on the UI unit 11. The display device 10 may generate the tactile feedback 43 of the second UI 42.

As described above, upon detection of the user's gaze, the display device 10 may detect the first contact 22 that makes a sliding movement on the first UI 40 and thus may move the first UI 40 including the tactile feedback 41. The display device 10 may output the second UI 42 including the tactile feedback 43 in succession to the first UI 40. Thus the user may feel the tactile feedback 43 of the second UI 42 and thus control the display device 10 accordingly.

FIG. 5 illustrates a method for maintaining a tactile feedback of a UI, when a user's gaze has not been detected according to an embodiment. In the left drawing of FIG. 5, the display device 10 may provide the user with a UI 50 on the UI unit 11. The display device 10 may generate a tactile feedback of the UI 50. The display device 10 may generate the tactile feedback in an area included in the UI 50. For example, the display device 10 may generate a first tactile feedback in a first area 51 and a second tactile feedback in a second area 52 on the UI 50, as illustrated in the left drawing of FIG. 5.

The display device 10 may sense the user's gaze through the camera unit. When the user's gaze has not been detected, the display device 10 may operate in the following manner.

The display device 10 may sense the first contact 22 of the user on the UI unit 11. The display device 10 may sense the first contact 22 that makes a leftward sliding movement on the UI 50. The display device 10 may maintain the UI 50 at the same position in response to the first contact 22 and generate a tactile feedback of the UI 50. That is, the display device 10 may generate the first tactile feedback in regard to the first contact 22 on the first area 51. Likewise, when the user makes a sliding movement on the UI unit 11 with the first contact 22, the display device 10 may generate the first tactile feedback, while maintaining the UI 50 at the same position. Therefore, the user may identify the shape of the first tactile feedback in the first area 51 by feeling the first tactile feedback.

In the right drawing of FIG. 5, when the user makes a sliding movement from the first area 51 to the second area 52 on the UI 50 with the first contact 22, the display device 10 may generate the second tactile feedback in regard to the first contact 22 moved to the second area 52. Herein, the display device 10 may keep the UI 50 at the same position, while the first contact 22 is moving. Therefore, the user may recognize in what shape a tactile feedback has been generated in the second area 52 by feeling the second tactile feedback.

As described above, in the case where the user's gaze has not been detected, upon input of the first contact 22 that makes a sliding movement on the UI 50, the display device 10 may generate a tactile feedback in each area, while keeping the UI 50 at the same position. Thus, the user may feel the tactile feedbacks in the areas included in the UI 50. Accordingly, the user may control the display device 10 based on the felt tactile feedbacks.

FIG. 6 illustrates a method for switching a visual feedback of a UI to a tactile feedback of the UI, when a user's gaze has not been detected according to an embodiment. In the left drawing of FIG. 6, the display device 10 may provide the user with a UI 60 on the UI unit 11. The display device 10 may generate a visual feedback 61 of the UI 60. The display device 10 may sense the user's gaze through the camera unit. When the user's gaze has not been detected, the display device 10 may operate in the following manner.

The display device 10 may sense the first contact 22 of the user on the UI unit 11. The display device 10 may sense the first contact 22 that makes a leftward sliding movement on the UI 60. Since the user's gaze has not been detected, the display device 10 may maintain the UI 60 at the same position and generate a tactile feedback 62 of the UI 60, in response to the first contact 22, as illustrated in the right drawing of FIG. 6. Even when the user makes a sliding movement on the UI unit 11 with the first contact 22, the display device 10 may generate the tactile feedback 62, while maintaining the UI 60 at the same position. Therefore, the user may identify the area and shape of the tactile feedback 62 included in the UI 60 by feeling the tactile feedback 62. In some embodiments, when the user's gaze has not been detected, the display device 10 may deactivate the displayed visual feedback 60, thereby reducing power consumption.

As described above, in the case where the user's gaze has not been detected, upon input of the first contact 22 that makes a sliding movement on the UI 60, the display device 10 may keep the UI 60 at the same position. The display device 10 may further change the visual feedback 61 to the tactile feedback 62 on the UI 60 and generate the tactile feedback 62 in an area corresponding to the displayed position of the visual feedback 61. Therefore, the user may feel the tactile feedback 62 in the area included in the UI 60. Accordingly, the user may control the display device 10 based on the felt tactile feedback 62.

Figure 7:
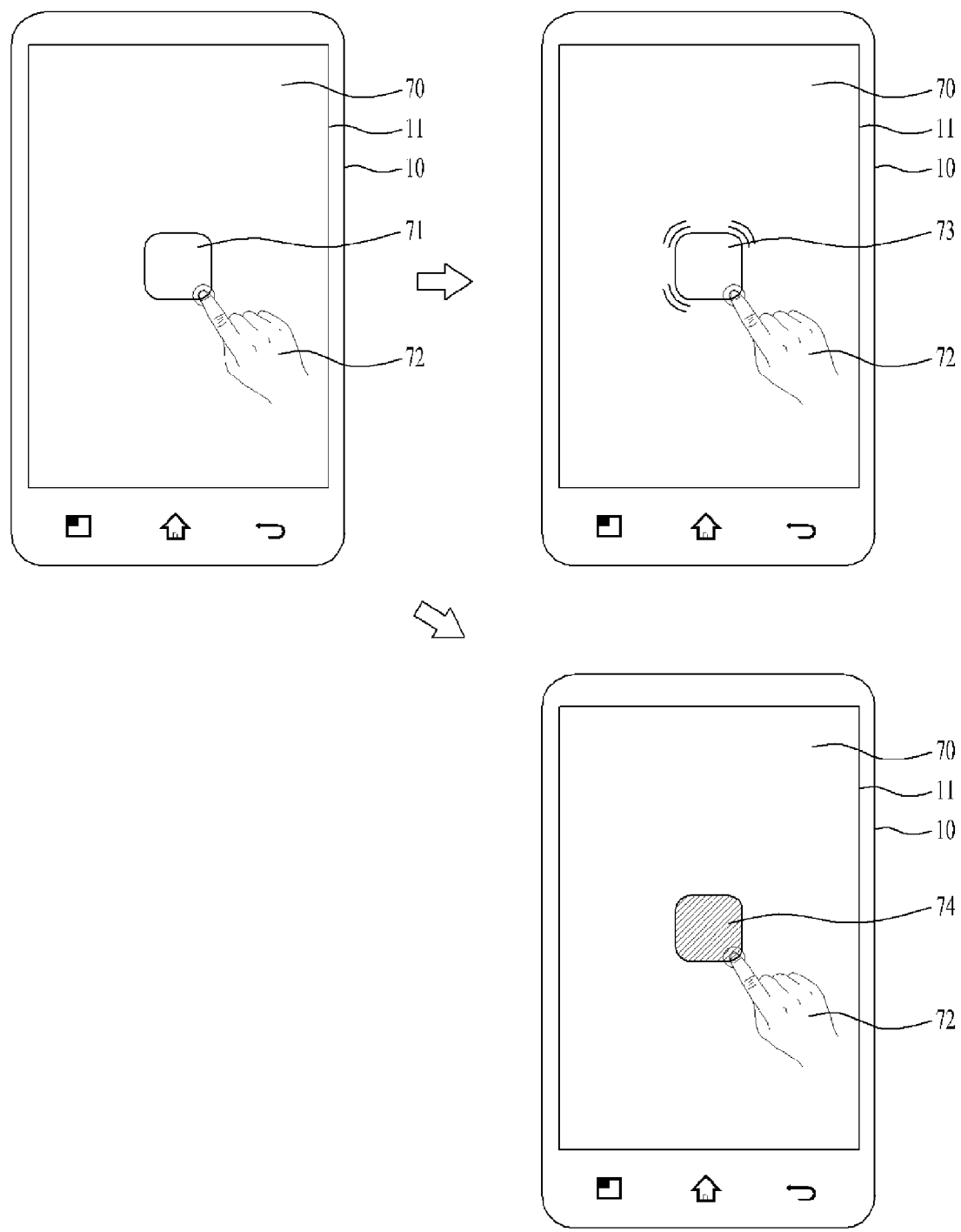
FIG. 7 illustrates changes in the state of an object depending on whether a user's gaze is detected in the display device according to an embodiment.

FIG. 7 illustrates a change in the state of an object depending on whether a user's gaze is detected in the display device according to an embodiment. The display device 10 may display a UI 70 on the UI unit 11. The display device 10 may display at least one object as contents of the UI 70.

The display device 10 may display the object in a first or second state. The first state is a steady state. Upon detection of a user's contact on the object in the first state, the display device 10 may execute an application corresponding to the object. The second state is a transient state temporarily out of the first state. For example, the display device 10 may change the position of the object or eliminate the object in the second state according to a user's contact. In addition, the display device 10 may display a sub-menu of the second-state object according to a user's contact. A state in which the position of the second-state object is changed will be taken as an example of the second state in the following description.

As illustrated in the left upper drawing of FIG. 7, the display device 10 may display a UI 70 on the UI unit 11. The display device 10 may display a visual feedback for at least one object as contents of the UI 70. The display device 10 may display the object in the first state as a first visual feedback 71. The display device 10 may detect a contact 72 kept for a first time threshold or longer on the first-state object displayed as the first visual feedback 71. The first time threshold may be set in the fabrication process of the display device 10 or by the user. Hereinbelow, the contact 72 kept for the first time threshold or longer on the first-state object may be referred to as a long touch.

As described before with reference to FIG. 2, the display device 10 may detect the user's gaze through the camera unit. Upon detection of the user's long touch on an object, the display device 10 may perform a different operation regarding the object depending on whether the user's gaze is also detected. The right upper drawing of FIG. 7 illustrates a method for operating the display device 10, when a user's gaze is detected along with detection of a long touch. Upon detection of a user's gaze together with a long touch on the object, the display device 10 may switch the object from the first state to the second state. The display device 10 may display a second visual feedback 73 for the second-state object. The display device 10 may enlarge the first visual feedback 71 or render the first visual feedback 71 semi-transparent as the second visual feedback 73. In addition, the display device 10 may give the graphical effect of wobbling to the first visual feedback 71 as the second visual feedback 73.

The user may view the second visual feedback 73 and thus control the second-state object accordingly. For example, the user may move or eliminate the second-state object.

The right lower drawing of FIG. 7 illustrates a method for operating the display device 10, when a long touch is detected but a user's gaze is not detected. Upon detection of a long touch, if the user's gaze has not been detected, the display device 10 may keep the object in the first state. The display device 10 may further generate a tactile feedback 74 in the area of the object. The user may feel the tactile feedback 74 and control the first-state object accordingly. For example, the user may execute an application corresponding to the object by touching the object continuously or pressing the object with a force equal to or larger than a predetermined pressure threshold.

Therefore, when the user's gaze has not been detected, the display device 10 may keep the object in the first state despite input of a long touch. Hence, the user may recognize the object in a tactile manner and execute the object. In some embodiments, when generating the tactile feedback 74 of the object, the display device 10 may deactivate the first visual feedback 71 of the object.

Figure 8:
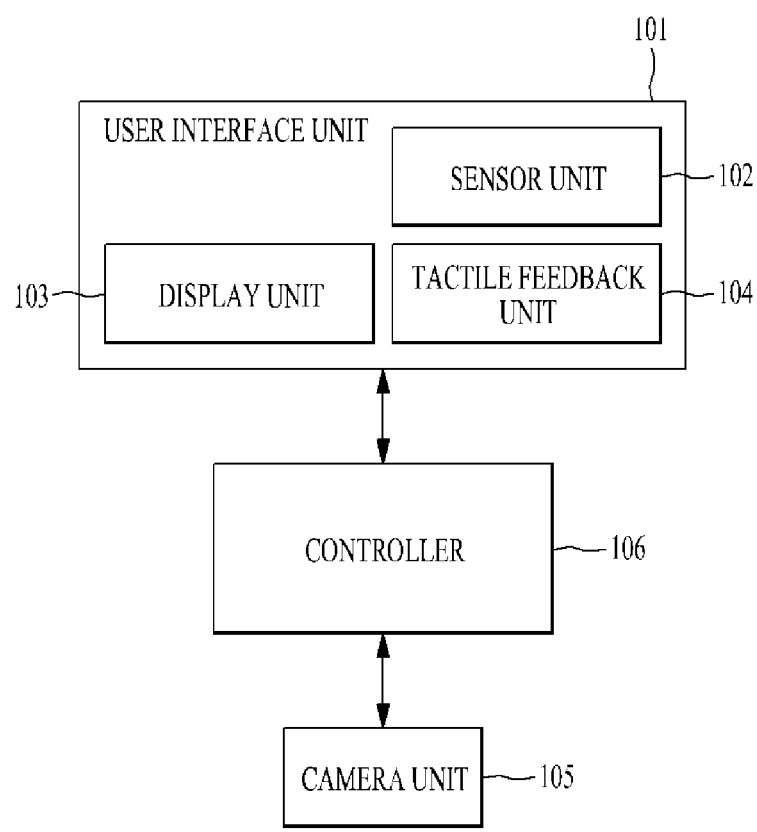
FIG. 8 is a block diagram of the display device according to an embodiment.

FIG. 8 is a block diagram of the display device according to an embodiment. The display device may include a UI unit 101, a camera unit 105, and a controller 106.

The UI unit 101 may provide a UI so that the user may control a display unit. The UI unit 101 is disposed on a surface of the display device, for sensing a user's touch input and providing a UI to the user. The UI unit 101 may interface between the user and the display device, for information exchange. The UI unit 101 may provide a visual UI for visual perception and a tactile UI for tactile perception as UIs. The UI unit 101 may include a sensor unit 102, a display unit 103, and a tactile feedback unit 104.

The sensor unit 102 may sense a user's contact on or touch input to the UI unit 101. The sensor unit 102 may sense the user's contact for controlling a UI on the UI unit 101. The sensor unit 102 may sense the user's contact or touch input using at least one of a resistive touch sensor and a capacitive touch sensor. The sensor unit 102 may further sense a user's hovering movement using at least one of a proximity sensor and an image sensor. The sensor unit 102 may sense a user's hovering movement that is apart from the UI unit 101 by a predetermined distance. The sensor unit 102 may convert the sensed contact, touch input, or hovering movement to an electrical signal and provide information about the user's contact, touch input, or hovering movement to the controller 106 by the electrical signal.

The sensor unit 102 may sense a user's contact on a soft button of a UI. Upon sensing the contact on the soft button, the display device may execute a function corresponding to the soft button, if the contact between the user's finger and the UI unit lasts for a time period equal to or longer than a time threshold. In an embodiment, if the sensor unit is a piezoelectric sensor, the display device may sense pressure on the soft button. Upon sensing a second contact, the display device may execute a function corresponding to the soft button, if the pressure of the second contact is equal to or larger than a pressure threshold.

The display unit 103 may display a visual feedback of a UI. The display unit 103 may display a visual feedback corresponding to an object included in the UI. The user may control the display device by viewing the visual feedback of the UI. If the display unit 103 is a touch sensitive display unit, the display unit 103 and the afore-described sensor unit 102 may form a single unit. Therefore, the user's contact on or touch input to the display unit 103 may be sensed and information about the sensed contact or touch input to the controller 106 may be provided to the controller 106. The display unit 103 may include a flexible display. The display unit 103 may include a Liquid Crystal Display (LCD) panel, a Light Emitting Diode (LED) panel, an Organic Light Emitting Diode (OLED) panel, and an electronic ink panel.

The tactile feedback unit 104 may generate a tactile feedback in an area in which an object is positioned on a UI. The tactile feedback unit 104 may provide a UI to the user by generating a tactile feedback on the UI unit 101. The user may feel the tactile feedback on the UI unit 101 and control the display device accordingly.

The tactile feedback unit 104 may generate a tactile feedback for the user in the following manner. The tactile feedback unit 104 may generate a tactile feedback to a user's finger that touches the UI unit 101 by means of a micro vibration actuator. The tactile feedback unit 104 may control a vibration frequency and a vibration magnitude, thus controlling the strength of a tactile feedback between the user's finger and the UI unit 101.

In another embodiment, the tactile feedback unit 104 may generate a tactile feedback for the user by flowing fine current on the UI unit 101. The tactile feedback unit 104 may control the magnitude and generation period of the current so that the user may have a different tactile feeling.

The tactile feedback unit 104 may generate a tactile feedback by ultrasonic resonance. The tactile feedback unit 104 may generate a tactile feedback for the user by creating a plurality of ultrasonic waves and resonating a predetermined area with the ultrasonic waves. The tactile feedback unit 104 may generate a tactile feedback in an area in which a hovering movement is sensed. The tactile feedback unit 104 may generate a different tactile feedback by controlling a resonant frequency and a resonant period.

The camera unit 105 may detect a user's gaze. The camera unit 105 may detect the user's gaze by detecting at least one of the user's eye blinking, face, and pupil. Upon receipt of a contact on or a touch input to the UI unit 101, the camera unit 105 may detect the user's gaze. The camera unit 105 may provide information indicating whether the user's gaze has been detected to the controller 106.

The controller 106 may control the UI unit 101 and the camera unit 105. The controller 106 may receive first information about a contact or a touch input from the sensor unit 102. In addition, the controller 106 may receive second information indicating whether the user's gaze has been detected from the camera unit 105. The controller 106 may control the UI unit 101 based on the first information and the second information.

If the user contacts the UI unit 101 and the user's gaze is detected, the controller 106 may switch an output UI to another UI according to the user's contact. For example, the controller 106 may output a first UI on the UI unit 101. As described before with reference to FIGS. 2, 3 and 4, if a contact that makes a sliding movement on the first UI is sensed and the user's gaze is detected, the controller 106 may switch the first UI to a second UI.

If the user's contact on the UI unit 101 is received and the user's gaze is not detected, the controller 106 may maintain the output UI in response to the user's contact. In addition, the controller 106 may generate a tactile feedback of the output UI. For example, the controller 106 may output the first UI on the UI unit 101. As described before with reference to FIGS. 5 and 6, if a contact that makes a sliding movement on the first UI is sensed and the user's gaze is not detected, the controller 106 may generate a tactile feedback of the first UI, while maintaining the first UI.

The display device illustrated in FIG. 8 is shown in block form according to an embodiment. Separate blocks are logically distinguished elements in the display device. Therefore, the above-described elements of the display device may be implemented on one or more chips according to a device design.

Figure 9:
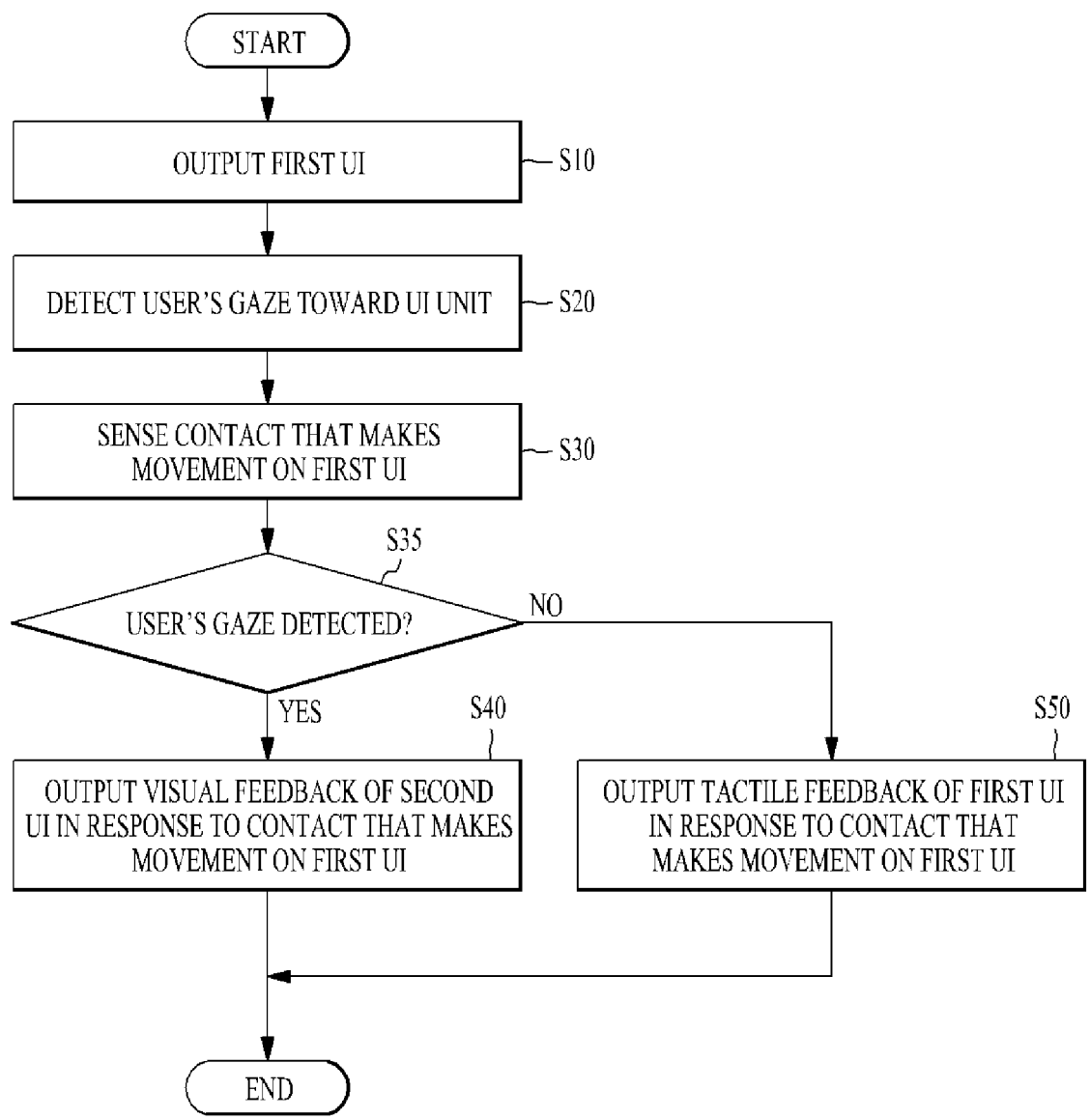
FIG. 9 is a flowchart illustrating a method for controlling the display device according to an embodiment.

FIG. 9 is a flowchart illustrating a method for controlling the display device according to an embodiment. Referring to FIG. 9, the display device may output a first UI on the UI unit (S10). As illustrated in FIG. 1, the display device may output at least one of a tactile feedback and a visual feedback of the first UI. The display device may display the visual feedback on the display unit and may generate the tactile feedback through the tactile feedback unit.

The display device may detect a user's gaze toward the UI unit through the camera unit (S20). As described before with reference to FIG. 8, the display device may detect the user's gaze by detecting at least one of eye blinking, a face, and a pupil of the user. In an embodiment, when sensing a first contact that makes a movement on the first UI in the subsequent step S30, the display device may detect the user's gaze. The display device may provide information about the detected user's gaze to the controller.

The display device may sense the first contact that makes a movement on the first UI through the sensor unit (S30). As described before with reference to FIG. 8, the display device may include at least one of a resistive sensor and a capacitive sensor as the sensor unit. In addition, the display device may sense a movement hovering above the first UI through the sensor unit. Even though the user's finger hovers above the UI unit by a predetermined distance without touching the UI unit, moving above the UI unit, the display device may sense this hovering movement. The display device may convert the sensed result to an electrical signal and provide information about the first contact that makes a movement on the first UI to the controller by the electrical signal. In some embodiments, the step S20 of detecting a user's gaze may be performed after the first contact is sensed.

The display device may determine whether the user's gaze has been detected (S35). In operating in response to the first contact, the display device may use information about the user's gaze detected in step S20. In some embodiments, the display device may make the decision as to whether the user's gaze has been detected at the moment of detecting the user's gaze.

If the user's gaze has been detected, the display device may output a visual feedback of a second UI in response to the first contact that makes a movement on the first UI (S40). As described with reference to FIGS. 2 and 3, the display device may display the visual feedback of the second UI in correspondence with the movement direction and speed of the first contact. The user may view the second UI and control the display device accordingly. The display device may move the first UI output in step S10 to a side of the display device according to the moving direction of the first contact. Therefore, the display device may eliminate the first UI from the UI unit. Further, the display device may output a tactile feedback corresponding to the visual feedback of the second UI.

On the contrary, if the user's gaze has not been detected, the display device may output a tactile feedback of the first UI in response to the first contact that makes a movement on the first UI (S50). As described before with reference to FIGS. 5 and 6, the display device may keep the first UI output in step S10 at the same position in response to the first contact that makes a movement on the first UI. The display device may output the tactile feedback of the first UI, while keeping the first UI at the same position.

If the first UI is moving in response to the first contact, the user may have difficulty in feeling the tactile feedback of the first UI. Accordingly, when the display device outputs the tactile feedback of the first UI, the display device may render the first UI stationary at its position. The user may feel the output first UI and thus control the display device accordingly. In some embodiments, if the first contact is a hovering movement, the display device may generate a tactile feedback by generating ultrasonic resonance in an area in which the hovering movement is made.

The display device may indicate at least one of the shape and position of a soft button included in the first UI using a first tactile feedback of the first UI. Upon sensing a second contact touching the soft button indicated by the first tactile feedback, the display device may execute a function corresponding to the soft button if the second contact lasts for a time period equal to or larger than a time threshold. In some embodiments, if the sensor unit is a piezoelectric sensor, the display device may sense pressure on the soft button. Upon sensing the second contact, the display device may execute a function corresponding to the soft button if the pressure of the second contact is equal to or larger than a pressure threshold.

According to the disclosure, the display device can output a visual feedback and a tactile feedback.

According to the disclosure, the display device can output at least one of a visual feedback and a tactile feedback by sensing a user's gaze.

According to the disclosure, the display device can control a user interface differently regarding the same touch input depending on whether a user's gaze has been sensed or not.

According to the disclosure, if a user's gaze has not been detected, upon receipt of a touch input that makes a sliding movement on a display unit, the display device can maintain an output user interface.

According to the disclosure, if a user's gaze has been detected, upon receipt of a touch input that makes a sliding movement on the display unit, the display device can switch an output user interface to another user interface.

It will be apparent to those skilled in the art that various modifications and variations can be made in the disclosure without departing from the spirit or scope of the disclosure. Thus, it is intended that the disclosure covers the modifications and variations of this disclosure provided they come within the scope of the appended claims and their equivalents.

What is claimed is:

1. A display device comprising:
   a camera unit;
   a display unit; and
   a controller configured to:
   output at least one of a first visual feedback and a first tactile feedback of a first User Interface (UI) on the display unit,
   detect a user's gaze through the camera unit,
   sense a first contact making a movement on the first User Interface UI through a sensor unit, the first User Interface UI including at least one soft button corresponding to an application or a function of the display device,
   output a second visual feedback of a second User Interface UI on the display unit in correspondence with the first contact making the movement on the first User Interface UI, upon detection of the user's gaze,
   deactivate the output of the first visual feedback and output the first tactile feedback of the first User Interface UI in correspondence with the first contact making the movement on the first User Interface UI, if the user's gaze is not detected,
   sense a second contact touching the soft button for a time period equal to or greater than a time threshold,
   activate a long-touch function of the soft button, upon detection of the user's gaze, and
   deactivate the long-touch function of the soft button, if the user's gaze is not detected.

2. The display device according to claim 1, wherein the controller is further configured to output the first tactile feedback of the first User Interface UI in correspondence with at least one of a position and a shape of the first visual feedback.

3. The display device according to claim 1, wherein upon detection of the user's gaze, the controller is configured to further output a second tactile feedback corresponding to the second visual feedback of the second User Interface UI.

4. The display device according to claim 1, wherein upon detection of the user's gaze, the controller is configured to eliminate the first User Interface UI from the display unit by moving the first User Interface UI in correspondence with a moving direction of the first contact.

5. The display device according to claim 1, wherein if the user's gaze is not detected, the controller is configured to maintain the first User Interface UI at the same position in response to the first contact making the movement on the first User Interface UI.

6. The display device according to claim 1, wherein if the user's gaze is not detected, the controller is configured to deactivate the first visual feedback of the first User Interface UI.

7. The display device according to claim 1, wherein the first contact making the movement on the first User Interface UI includes a hovering movement above the display unit by a first distance.

8. The display device according to claim 7, wherein if the hovering movement is sensed as the first contact, the controller is configured to generate the first tactile feedback with ultrasonic resonance at a position above the display unit by the first distance.

9. The display device according to claim 1, wherein if the user's gaze is not detected, the controller is configured to further sense a third contact touching the soft button, and if the third contact lasts for a time period equal to or larger than a time threshold, the controller is configured to further execute the function or application corresponding to the soft button.

10. The display device according to claim 1, wherein the controller is further configured sense a third contact touching the soft button, and wherein if the third contact has a pressure equal to or larger than a pressure threshold, the controller is configured to further execute the function or application corresponding to the soft button.

11. The display device according to claim 1, wherein the first tactile feedback of the first User Interface UI indicates at least one of a shape and a position of the soft button included in the first User Interface UI.

12. The display device according to claim 1, wherein the long-touch function of the soft button is a function of switching the soft button to a transient state and the position of the soft button is changeable on the first User Interface UI in the transient state.

13. The display device according to claim 1, wherein the camera unit is configured to detect the user's gaze by detecting at least one of a face and a pupil of the user.

14. The display device according to claim 1, wherein the display device is configured to include at least one of a smart phone, a smart pad, a music player, a smart table, a monitor, a television, a remote controller, and a tablet computer.

15. The display device according to claim 1, wherein the display unit is configured to include at least one of a Liquid Crystal Display (LCD) panel, a Light Emitting Diode (LED) panel, an Organic Light Emitting Diode (OLED) panel, and an electronic ink panel.

16. The display device according to claim 1, wherein controller is further configured to output the tactile feedback by ultrasonic vibration and to control the tactile feedback by changing at least one of a frequency and magnitude of the ultrasonic vibration.

17. The display device according to claim 1, wherein controller is further configured to output the tactile feedback by generating fine current on the display unit and to control the tactile feedback by changing at least one of a magnitude and a generation period of the fine current.

18. A method for controlling a display device, the method comprising:

outputting at least one of a first visual feedback and a first tactile feedback of a first User Interface (UI) on a display unit, the first User Interface UI including at least one soft button corresponding to an application or a function of the display device;

detecting a user's gaze through a camera unit;

sensing a first contact making a movement on the first User Interface UI;

outputting a second visual feedback of a second User Interface UI in correspondence with the first contact making the movement on the first User Interface UI, upon detection of the user's gaze;

deactivating the output of the first visual feedback and outputting the first tactile feedback of the first User Interface UI in correspondence with the first contact making the movement on the first User Interface UI, if the user's gaze is not detected;

sensing a second contact touching the soft button for a time period equal to or greater than a time threshold;

activating a long-touch function of the soft button, upon detection of the user's gaze; and deactivating the long-touch function of the soft button, if the user's gaze is not detected.

\* \* \* \* \*